United States Patent
Kraska et al.

(10) Patent No.: US 10,005,453 B2
(45) Date of Patent: Jun. 26, 2018

(54) SYSTEM AND METHOD FOR COORDINATED OPERATION OF INTEGRATED STARTER GENERATOR AND POWER CONVERTER IN A VEHICLE

(71) Applicant: FORD GLOBAL TECHNOLOGIES, LLC, Dearborn, MI (US)

(72) Inventors: Marvin Paul Kraska, Dearborn, MI (US); Mark Steven Yamazaki, Canton, MI (US); Mark J. Ferrel, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/085,037

(22) Filed: Mar. 30, 2016

(65) Prior Publication Data
US 2017/0282902 A1 Oct. 5, 2017

(51) Int. Cl.
*B60W 20/40* (2016.01)
*B60W 10/08* (2006.01)
*B60L 11/18* (2006.01)

(52) U.S. Cl.
CPC .......... *B60W 20/40* (2013.01); *B60L 11/1803* (2013.01); *B60W 10/08* (2013.01)

(58) Field of Classification Search
CPC .... B60W 20/40; B60W 10/08; B60L 11/1803
See application file for complete search history.

(56) References Cited

U.S. PATENT DOCUMENTS

| | | | |
|---|---|---|---|
| 8,314,504 B2 | 11/2012 | Gibson et al. | |
| 2012/0075763 A1 | 3/2012 | Sieber | |
| 2013/0006453 A1* | 1/2013 | Wang | B60W 50/0205 701/22 |
| 2013/0249468 A1 | 9/2013 | Bajjuri et al. | |

FOREIGN PATENT DOCUMENTS

EP 2930347 A1 10/2015

\* cited by examiner

*Primary Examiner* — Michael D Lang
(74) *Attorney, Agent, or Firm* — David Kelley; Brooks Kushman P.C.

(57) ABSTRACT

A vehicle includes a hybrid powertrain with a motor/generator electrically coupled to a high-voltage bus to provide propulsion. The vehicle also includes an integrated starter/generator electrically copulated to a low-voltage bus and configured to start the engine. A vehicle power system includes a power converter electrically coupled between the high-voltage bus and the low-voltage bus. During engine start events, operation of the integrated starter/generator is coordinated with operation of the power converter to reduce voltage sag on the low-voltage bus. An increase rate of current supplied to the integrated starter/generator is limited such that a current output of the power converter does not saturate at a maximum current output for a period of time after initiating the engine start event.

20 Claims, 3 Drawing Sheets

SYSTEM AND METHOD FOR
COORDINATED OPERATION OF
INTEGRATED STARTER GENERATOR AND
POWER CONVERTER IN A VEHICLE

TECHNICAL FIELD

This application generally relates to a hybrid vehicle including a high-voltage electric machine for propulsion and a low-voltage integrated starter generator for engine starting.

BACKGROUND

A hybrid vehicle typically includes an engine and one or more electric machines that provide propulsion for the vehicle. One of the electric machines may be used to start the engine. Such configurations generally eliminate the need for a traditional starter motor that is coupled to the engine for starting.

SUMMARY

A vehicle includes an electric machine electrically coupled to a low-voltage bus and coupled to an engine. The vehicle also includes a power converter electrically coupled between a high-voltage bus and the low-voltage bus. The vehicle also includes a controller programmed to, in response to an increase in current demand for the electric machine, limit a current increase rate of the electric machine to a rate that prevents saturation of a power converter current output for at least a predetermined time.

A vehicle power system includes a power converter electrically coupled between a high-voltage bus and a low-voltage bus. The vehicle power system also includes a controller programmed to, in response to an increase in current demand of an electric machine for engine cranking powered from the low-voltage bus exceeding a predetermined amount, limit a current increase rate of the electric machine to a predetermined rate to limit a power converter output current increase rate.

A method includes limiting by a controller a rate of current increase of an integrated starter generator coupled to a low-voltage bus to a rate that is less than a demanded increase rate such that saturation of a current output of a power converter coupled to the low-voltage bus is prevented for at least a predetermined time.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
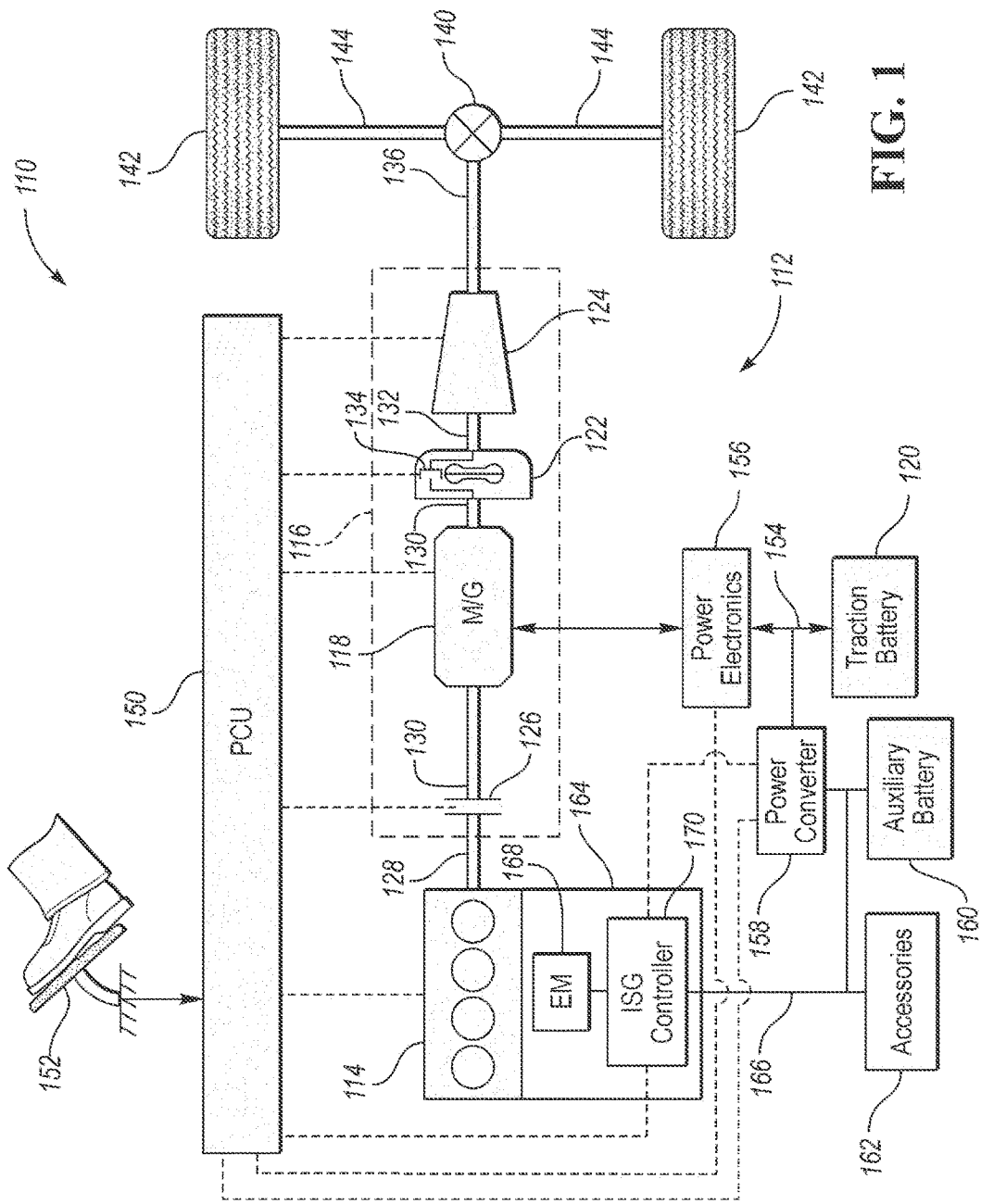
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the traction battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the traction battery 120. The disconnect clutch 126 can also be disengaged to isolate the engine 114 from the remainder of the powertrain 112 such that the M/G 118 can act as the sole drive source for the HEV 110. Shaft 130 extends through the M/G 118. The M/G 118 is continuously drivably connected to the shaft 130, whereas the engine 114 is drivably connected to the shaft 130 only when the disconnect clutch 126 is at least partially engaged.

The M/G 118 is connected to the torque converter 122 via shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements are controllable through a shift schedule that connects and disconnects certain elements of the gear sets to control the ratio between a transmission output shaft 136 and the transmission input shaft 132. The gearbox 124 is automatically shifted from one ratio to another based on various vehicle and ambient operating conditions by an associated controller, such as a powertrain control unit (PCU) 150. The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 further includes an associated powertrain control unit (PCU) 150. While illustrated as one controller, the PCU 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge traction battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by PCU 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by PCU 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle. In general, depressing and releasing the pedal 152 generates an accelerator pedal position signal that may be interpreted by the controller 150 as a demand for increased power or decreased power, respectively. Based at least upon input from the pedal, the controller 150 commands torque from the engine 114 and/or the M/G 118. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle with the M/G 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy through a high-voltage bus 154 to power electronics 156 that may include an inverter, for example. The high-voltage bus 154 includes wiring and conductors for conducing current between modules. The power electronics 156 convert DC voltage from the traction battery 120 into AC voltage to be used by the M/G 118. The PCU 150 commands the power electronics 156 to convert voltage from the traction battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be stored in the traction battery 120. The M/G 118 may act as a generator while the engine 114 is providing propulsion power for the vehicle 110, for example. The M/G 118 may additionally act as a generator during times of regenerative braking in which rotational energy from spinning wheels 142 is transferred back through the gearbox 124 and is converted into electrical energy for storage in the traction battery 120.

It should be understood that the schematic illustrated in FIG. 1 is merely exemplary and is not intended to be limited. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

The vehicle 110 may utilize the M/G 118 to start the engine 118. The PCU 150 may command the disconnect clutch 126 to close and request torque from the M/G 118 via the power electronics 156. The torque from the M/G 118 rotates the engine so that the engine speed increases to a predetermined speed at which time the engine 114 may be commanded to provide fuel and spark to maintain continued engine rotation. The torque converter 122 may provide some torsional isolation during engine cranking and initial startup. In some vehicle configurations, a low-voltage starter motor may also be coupled to the engine 118 to provide a secondary or backup means of starting the engine 118.

The vehicle 110 may further include a power converter module 158 and an auxiliary battery 160. The auxiliary battery 160 may be a low-voltage battery such as a 12 Volt battery that is commonly used in automobiles. Terminals of the auxiliary battery 160 may be electrically coupled to a low-voltage bus 166. The low-voltage bus 166 includes wiring and conductors for conducting current between connected modules. The power converter 158 may be electrically coupled between the high-voltage bus 154 and the low-voltage bus 166. The power converter module 158 may be a DC/DC converter that is configured to convert voltage from the high-voltage bus 154 to voltage compatible with the low-voltage bus 166. The power converter 158 may be further configured to convert voltage from the low-voltage bus 166 to voltage compatible with the high-voltage bus 154. For example, the power converter 158 may be configured to provide a two-way flow of current between the high-voltage bus 154 and the low-voltage bus 166.

The vehicle 110 may include accessory loads 162 coupled to the low-voltage bus 166. The accessory loads 162 may include heaters, controllers, and any device that utilizes low-voltage power. The accessory loads 162 may draw power from low-voltage bus 166. Power on the low-voltage bus 166 is provided by the auxiliary battery 160 and the power converter 158.

The low-voltage starter motor is typically operated by switching battery voltage to the starter motor. A typical low-voltage starter motor system may not attempt to control the current flow to the starter motor. The low-voltage starter motor draws power from the low-voltage bus 166. The current draw of the starter motor may depend on impedance of the starter motor and the speed of rotation of the starter motor. During cranking of the engine 114, the starter motor may draw a large inrush current from the low-voltage bus 166. The impact of a large load on the low-voltage bus 166 is that the voltage may be decreased. This voltage decrease may impact other accessory loads 162. A typical impact is the dimming of lights that are presently activated during engine cranking. Such events are undesirable and may result in customer complaints.

Instead of a traditional starter motor, an integrated starter generator (ISG) 164 may be used for starting the engine 114. The ISG 164 may include an electric machine 168 that is coupled to the engine 114. The coupling between the electric machine 168 and the engine 114 may be a belt-driven system. In some configurations, the engine 114 may directly drive the electric machine 168 via a shaft. The ISG 164 may be configured to rotate the engine 114 to facilitate starting. The ISG 164 may be further configured to provide power to the low-voltage bus 166 when the engine 114 is rotating by operating the electric machine 168 as a generator.

The ISG 164 may include an ISG controller 170 that is in communication with the PCU 150. The ISG controller 170 may be configured to control and operate the electric machine 168. As such, the ISG controller 170 may include switching devices, including solid-state devices, such as Insulated Gate Bipolar Transistors (IGBT) that are coupled between the low-voltage bus 166 and terminals of the electric machine 168. The ISG controller 170 may output control signals to the switching devices to control a torque and speed of the electric machine 168. The ISG controller 170 may include one or more current measurement devices to measure current flowing to or from the electric machine 168. A variety of current measurement devices may be selected such as resistive networks and/or Hall effect devices. The ISG controller 170 may control current through the electric machine 168 by modulating the switching devices based on the measured current. Modulation of the switching devices may be via Pulse Width Modulation (PWM) in which a pulse width may be adjusted based on the current feedback.

The ISG 164 may include a speed feedback device coupled to the electric machine 168 for providing speed data of the electric machine 168 to the ISG controller 170. The speed feedback device may include a resolver, an encoder, magnetic sensor, or other available speed measuring devices.

When an engine start is commanded, the ISG controller 170 may build a magnetic field in the electric machine 168 by drawing current from the low-voltage bus 166. The power converter 158 switches current through an inductance to regulate a voltage level of the low-voltage bus 166 as a buck converter. The time to start the engine may be decreased by increasing a magnitude of current supplied to the electric machine 168. However, increasing the magnitude of the current in an uncontrolled manner may cause voltage sag on the low-voltage bus 166.

During engine starting, the current drawn from the ISG electric machine 168 may saturate the power converter 158 output. That is, the power converter 158 may supply an amount of current that is a rated current capacity of the power converter 158. When the power converter 158 is saturated, current may be limited to the rated current capacity. Any further current demand on the low-voltage bus 166 is then provided by the auxiliary battery 160. The result may be that the low-voltage bus voltage decreases as the auxiliary battery 160 supplies the remainder of the current required for cranking ($I_{batt}$). The current for cranking may include two components as follows:

$$I_{isg}=I_{dc/dc}+I_{batt} \quad (1)$$

Sagging of the low-voltage bus 166 may be minimized if the power converter 158 and the ISG 164 can coordinate operations during engine starting. The ISG controller 170 may be in communication with the power converter 158 via a vehicle network and/or direct connection. The power converter 158 may output a present current regulation level and a maximum current limit. The power converter 158 may output a remaining current capacity that may be the difference between the maximum current limit and the present current regulation level. The ISG controller 170 may receive the present current regulation level, the maximum current limit, and the remaining current capacity. The ISG controller 170 may ramp or filter the current of the ISG electric machine 168 to limit the impact of the engine start to the low-voltage bus 166.

During vehicle operation, the power converter 158 may be operating at a current level to support demand from the accessories 162 and auxiliary battery 160. The power converter 158 may be configured to supply a current that is less than or equal to a maximum rated current output. The maximum rated current output may depend on the current carrying capacity of the components and wiring of the power converter 158. During operation, the power converter 158 may normally output a current level that is less than the maximum rated current output. The difference between the maximum rated current output and the present operating current level may define a remaining current capacity. The remaining current capacity may be the amount of current increase that may be supported by the power converter 158 before the current output is limited or saturated.

The ISG controller 170 may receive the remaining current capacity and utilize the value for determining the rate of increase in current for the electric machine 168. The ISG controller 170 may determine an initial current demand based on the remaining current capacity. The ISG controller 170 may be programmed to avoid commanding a current that would cause the total current from the low-voltage bus 166 to be greater than the remaining current capacity of the power converter 158. This may reduce the need for the auxiliary battery 160 to supply current during the engine start. The ISG controller 170 may be programmed to ramp the electric machine current at a rate of increase that is based on the remaining current capacity.

The ISG controller 170 may determine a rate of change of current based on the present current level and the maximum current limit of the power converter 158. Further, the rate of change may be limited by a desired rate of increase of the engine speed. For example, an engine start may be desired within a predetermined amount of time. Therefore, the engine speed must rise to a speed at which ignition can occur within the predetermined amount of time. This may define a minimum rate of change for the ISG electric machine current.

The rate of change of electric machine current may be computed as a quotient of the remaining current capacity and a predetermined time. The predetermined time may be selected to ensure that the engine is accelerated to a speed sufficient to allow the engine to be started. Further, in some situations, the computed rate of change may not be sufficient to accelerate the engine 114 in the desired time. Under high-load current conditions, the power converter 158 may already be operating near the maximum current limit (e.g., remaining current capacity is near zero). In situations in which the remaining current capacity is less than a threshold, a minimum increase rate may be defined. The controller may select the maximum of the computed value and the minimum increase rate to ensure that the engine is accelerated within the desired time period.

In some configurations, the ramp rate may be defined as a predetermined rate. The predetermined rate may be selected to minimize voltage sag on the low-voltage bus 166. In some configurations, the ramp rate may be a function of a state of charge of the auxiliary battery 160. The current increase rate may be limited to a rate that prevents saturation of the power converter current output for at least a predetermined time. The predetermined time may increase as a state of charge of the auxiliary battery 160 decreases. This may compensate for conditions in which the auxiliary battery 160 may be less capable of supporting the current load.

The limiting of the current increase rate to the electric machine 168 may be triggered by an increase in current demand of the electric machine 114 for engine cranking. The limiting of the current increase rate may be triggered by the current demand of the electric machine 168 exceeding a threshold.

Under certain conditions, the limited increase rate may be removed. For example, if the engine 114 remains in a non-running condition after a predetermined engine cranking time has expired, the current may be increased at a faster rate. Such a condition may be indicative of difficult engine starting conditions in which more torque is required for starting the engine. Rather than continue limiting the current to the electric machine 168 it may be beneficial to remove the restriction in an effort to start the engine 114.

The ISG controller 170 may output a rate of change of electric machine current to the power converter 158. The power converter 158 may utilize the rate of change to control operation of the switching devices in the power converter 158. The power converter 158 may use the rate of change of current to control the output current of the power converter 158. The power converter 158 may utilize the rate of change as part of a feedforward term in the control strategy. This may allow the power converter 158 to increase the current output in anticipation of the current demand from the ISG 164. This ensures that the low-voltage bus 166 can support the additional current demand from the ISG 164 for starting the engine 114.

The vehicle power system may be configured to operate the power converter 158 in a linear region of operation for as long as possible. So long as the change in current demanded from the ISG electric machine 168 is equal to the increase of current provided by the power converter 158 a voltage decrease on the low-voltage bus 166 may be avoided. This is beneficial as accessories 162 may be drawing current at the same time. Any voltage drop on the low-voltage bus 166 may cause a decrease in current to the accessories 162. The voltage drop may cause unsatisfactory effects such as lights dimming during engine crank.

Figure 2:
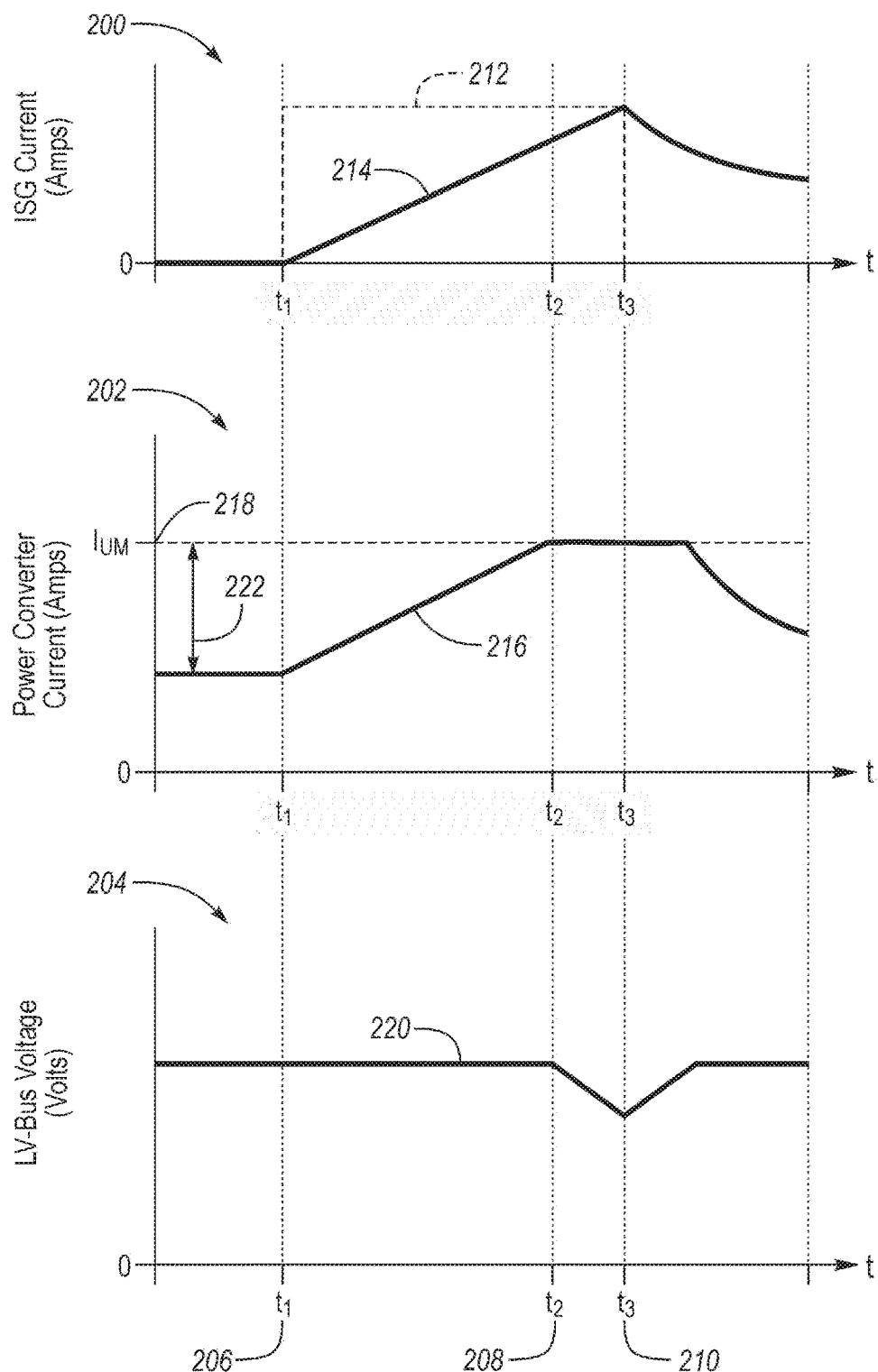
FIG. 2 depicts graphs detailing the operation of the electric machine and power converter during engine start operations.

FIG. 2 depicts graphs of the operation of the vehicle power system. A first plot 200 depicts ISG current over time. A second plot 202 depicts current output of the power converter 158 over time. A third plot 204 depicts a voltage of the low-voltage bus 166 over time. At a first time, $t_1$ 206, an engine start may be requested.

Prior to receiving an engine start request at the first time, $t_1$ 206, the engine 114 may be in a stopped or non-running condition. The ISG current 214 prior to the engine start request may be zero. The power converter output current 216 may be at a non-zero level that is below a power converter current limit, $I_{lim}$ 218. The difference between the power converter current limit 218 and the power converter output current represents the remaining current capacity 222. The low-voltage bus voltage 220 prior to the engine start is at a non-zero level that is supported by the auxiliary battery 160 and the power converter output current 216. The low-voltage bus voltage 220 may be powering accessory loads 162 during this time.

In response to the engine start request, the ISG controller 170 may provide current to the electric machine 168. As disclosed, the ISG controller 170 may limit the increase rate of the current. For example, a desired ISG current 212 may be a step function starting at the first time, $t_1$ 206. The current may be controlled to increase linearly as depicted by the actual ISG current 214. In some configurations, the increase rate may be varied.

The ISG controller 170 may ramp the ISG current 214 toward the desired ISG current 212. The desired ISG current 212 may represent the current demand for the electric machine 168. So long as the ISG current 214 has not achieved the desired ISG current 212, an increase in current demand for the electric machine 168 is present. A demanded increase rate may be determined based on a difference between the desired ISG current 212 and the ISG current 214 over a given time interval. A period of engine cranking may take place between the first time $t_1$ 206 and a second time $t_2$ 208. During engine cranking, the electric machine 168 rotates the engine to permit engine starting. During the engine cranking period, the ISG current 214 is ramped toward the desired ISG current 212. During the engine cranking period, the ISG current 214 draws current from the low-voltage bus 166. To prevent the low-voltage bus from sagging, the power converter 158 may provide additional current to support the engine cranking. During the engine cranking period, the power converter output current 216 may be ramped to a greater level at a rate similar to the ISG current 214. As the increase in ISG current 214 is provided by the power converter output current 216, the low-voltage bus voltage 220 may remain steady.

At the second time $t_2$ 208, the power converter output current 216 may become saturated at the power converter current limit 218. At this time, the power converter 158 may not be able to supply additional current to support the low-voltage bus 166. As depicted between the second time $t_2$ 208 and a third time $t_3$ 210, the power converter output current 216 is limited to the power converter current limit 218. However, the ISG current 214 may still be increasing toward the desired current 212. Any additional ISC current 214 may be supplied by the auxiliary battery 160. The effect on the low-voltage bus voltage 220 is that the voltage may decrease.

At the third time $t_3$ 210, the speed of the engine 114 may be at a level at which fuel may be injected and spark applied to place the engine 114 in a running condition. In the running condition, the engine 114 may provide torque for rotating the driveline. After the third time $t_3$ 210, the need for ISG electric machine current may be eliminated. The desired ISG current 212 may fall back to zero. The actual ISG current 214 may decay toward zero. As the ISG current 214 falls, the level may decay to a current level at which the power converter output current 216 may once again operate in a non-saturated mode. The low-voltage bus voltage 220 may increase after the engine has started as the ISG current 214 is decreasing.

While the engine 114 is running, the electric machine 168 may be operated as a generator. In the generator mode, the electric machine 168 may provide current to support the low-voltage bus 166 and charge the auxiliary battery 160. In configurations in which the power converter 158 is capable of bi-directional current flow, the electric machine 168 may be used to provide current to the high-voltage bus 154.

By limiting the increase rate of the electric machine current, an extended sag in the low-voltage bus voltage may be prevented. If the electric machine current 214 where to follow the desired current 212, the remaining capacity 222 of the power converter current output 216 would be consumed shortly after the first time $t_1$ 206. The sag in the low-voltage bus voltage 220 would appear shortly after the first time $t_1$ 206 as well. Further, the voltage drop may be to a lower level. The impact of the voltage drop may appear in accessory loads 162. For example, lights may dim as the voltage decreases. The speed of a fan may change during engine starts. Such effects may be noticeable to occupants of the vehicle. The vehicle power system described minimizes these impacts when the engine 114 is started.

Figure 3:
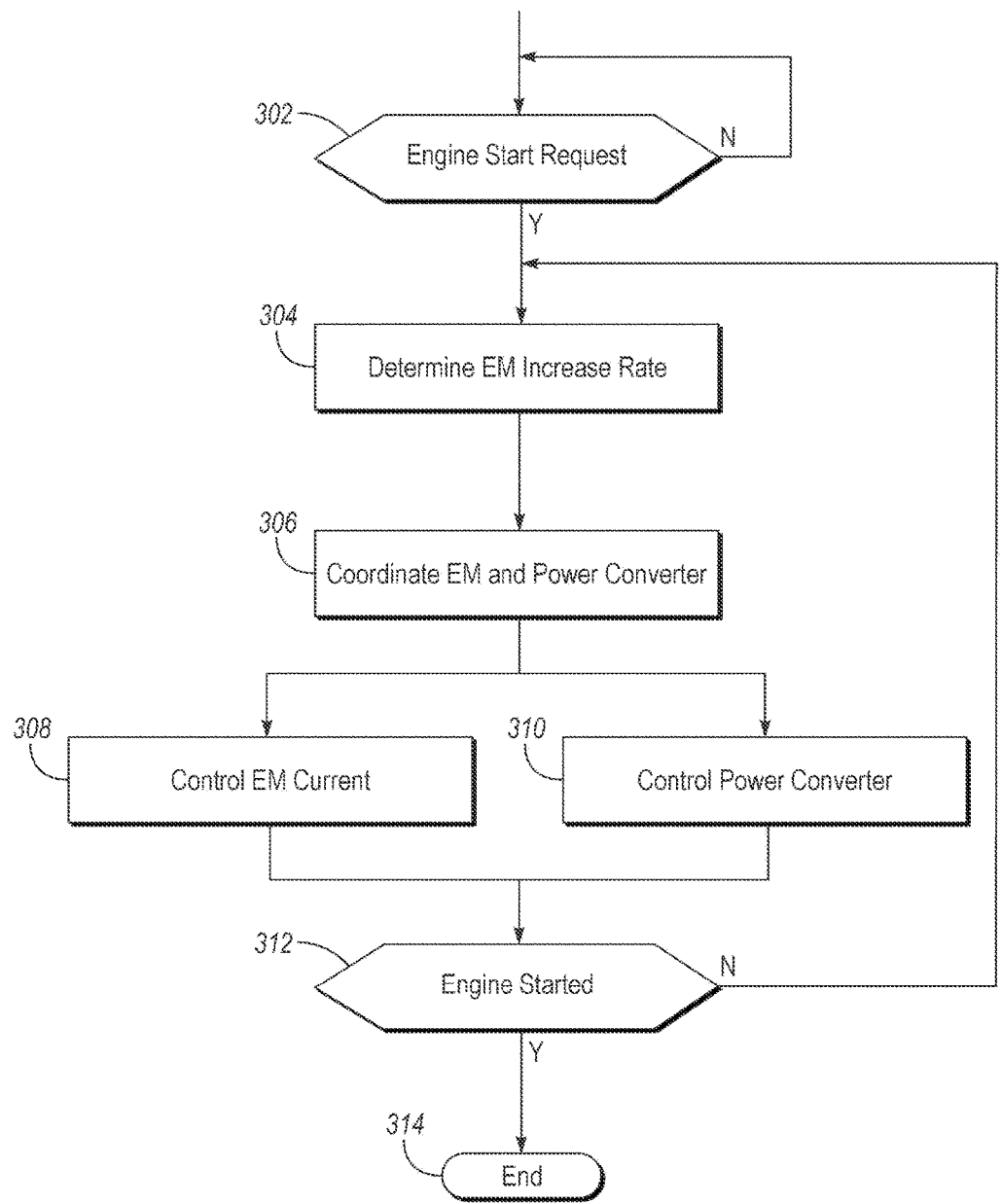
FIG. 3 is a flowchart of a possible sequence of operations for a vehicle power system.

FIG. 3 depicts a flowchart describing a possible sequence of operations and/or functions that may be performed to implement the vehicle power system described. The sequence of operations may be implemented as software in one or more controllers in the vehicle 110. At operation 302, a check may be performed to determine if an engine start is requested. If an engine start is not requested, operation 302 may be repeated and the condition may be continually monitored.

If an engine start is requested, operation 304 may be performed. At operation 304, the increase rate of the current for the electric machine is determined. For example, the remaining current capacity of the power converter 158 may be used to compute an increase rate.

At operation 306, control of the electric machine 168 and the power converter 158 may be coordinated. For example, the current increase rate of the electric machine 168 may be communicated to the controller that operates the power converter 158. At operation 308, the current of the electric machine 168 may be controlled according to the increase rate. At operation 310, the power converter 158 may be controlled according to the current demand on the low-voltage bus 166. At operation 312, a check may be performed to determine if the engine has started. If the engine has not started yet, execution may return to operation 304 and repeated. If the engine has started, the sequence may end at block 314.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    an electric machine electrically coupled to a low-voltage bus and coupled to an engine;
    a power converter electrically coupled between a high-voltage bus and the low-voltage bus; and
    a controller programmed to, in response to an increase in current demand for the electric machine, limit a current increase rate of the electric machine to a rate that prevents saturation of a power converter current output for at least a predetermined time.

2. The vehicle of claim 1 wherein the controller is further programmed to receive a remaining current capacity from the power converter, and wherein the rate is based on the remaining current capacity and the predetermined time.

3. The vehicle of claim 1 wherein the controller is further programmed to, in response to a remaining current capacity of the power converter being less than a predetermined amount, limit the current increase rate to a predetermined minimum rate.

4. The vehicle of claim 1 wherein the controller is further programmed to, in response to the power converter current output exceeding a predetermined current indicative of the power converter current output being saturated, limit the current increase rate to a predetermined rate.

5. The vehicle of claim 1 wherein the controller is further programmed to, in response to the engine remaining in a non-running condition after a predetermined engine cranking time has expired, cease limiting the current increase rate.

6. The vehicle of claim 1 wherein the predetermined time increases as a state of charge of a low voltage battery decreases.

7. A vehicle power system comprising:
    a power converter electrically coupled between a high-voltage bus and a low-voltage bus; and
    a controller programmed to, in response to an increase in current demand of an electric machine for engine cranking powered from the low-voltage bus exceeding a predetermined amount, limit a current increase rate of the electric machine to a predetermined rate to limit a power converter output current increase rate.

8. The vehicle power system of claim 7 wherein the controller is further programmed to receive a signal indicative of a remaining current capacity of the power converter and the predetermined amount is the remaining current capacity.

9. The vehicle power system of claim 7 wherein the controller is further programmed to receive a signal indicative of a remaining current capacity of the power converter and the predetermined rate is based on the signal.

10. The vehicle power system of claim 7 wherein the predetermined rate is based on a rate of current increase for the electric machine to increase an engine speed to a predetermined speed within a predetermined time.

11. The vehicle power system of claim 7 wherein the predetermined rate is based on a predetermined duration for engine cranking.

12. The vehicle power system of claim 7 wherein the controller is further programmed to, in response to signals indicative of an engine not running after a predetermined duration, cease limiting the current increase rate.

13. The vehicle power system of claim 7 wherein the controller is further programmed to, in response to current output of the power converter being saturated at a rated current output, limit the current increase rate of the electric machine to a second predetermined rate.

14. A method comprising:
limiting by a controller a rate of current increase of an integrated starter generator coupled to a low-voltage bus to a rate that is less than a demanded increase rate such that saturation of a current output of a power converter coupled to the low-voltage bus is prevented for at least a predetermined time.

15. The method of claim 14 further comprising receiving by the controller a signal indicative of a remaining current capacity from the power converter.

16. The method of claim 15 wherein the rate is based on the signal indicative of the remaining current capacity.

17. The method of claim 14 further comprising limiting by the controller the rate of current increase to a predetermined minimum rate in response to the current output becoming saturated.

18. The method of claim 14 further comprising increasing by the controller a current to the integrated starter generator at the demanded increase rate in response to receiving signals indicative of an engine not running after a predetermined duration.

19. The method of claim 14 further comprising outputting by the controller a signal indicative of the rate of current increase to the power converter.

20. The method of claim 19 further comprising receiving by the power converter the signal and controlling the current output according to the signal.

* * * * *